United States Patent
Horie et al.

(10) Patent No.: US 6,272,835 B1
(45) Date of Patent: Aug. 14, 2001

(54) SILENT CHAIN

(75) Inventors: Hiroshi Horie; Kazumasa Matsuno; Masao Maruyama; Shigekazu Fukuda; Yoshinori Iwasaki; Takayuki Funamoto; Hitoshi Ohara; Makoto Kanehira, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/698,792

(22) Filed: Oct. 27, 2000

(51) Int. Cl.[7] .................................................. F16G 13/04
(52) U.S. Cl. ........................... 59/6; 59/8; 59/13; 474/212
(58) Field of Search .............................. 59/6, 8, 13, 15, 59/4, 5; 474/212, 206, 213

(56) References Cited

U.S. PATENT DOCUMENTS

| | | | |
|---|---|---|---|
| 3,535,871 | * 10/1970 | Jeffrey | 474/212 |
| 5,803,854 | * 9/1998 | Tada et al. | 474/213 |
| 6,045,473 | * 4/2000 | Matsumoto et al. | 474/212 |
| 6,077,181 | * 6/2000 | Kanehira et al. | 474/212 |
| 6,112,510 | * 9/2000 | Ichikawa et al. | 59/5 |

* cited by examiner

Primary Examiner—David Jones
(74) Attorney, Agent, or Firm—Howson & Howson

(57) ABSTRACT

A silent chain is constituted by a number of articulately connected link plates each having an engagement surface for meshing engagement with teeth of a sprocket. The link plates are press-formed so that the engagement surface includes a smooth sheared surface. All of the link plates have respective sheared surfaces along not more than 60% of the thickness of the link plates. In order to reduce noises produced when the link plates mesh with the sprocket teeth, more than 50% of the link plates have respective sheared surfaces along 7 to 15% of the thickness of the link plates and are arranged randomly in the silent chain.

14 Claims, 3 Drawing Sheets

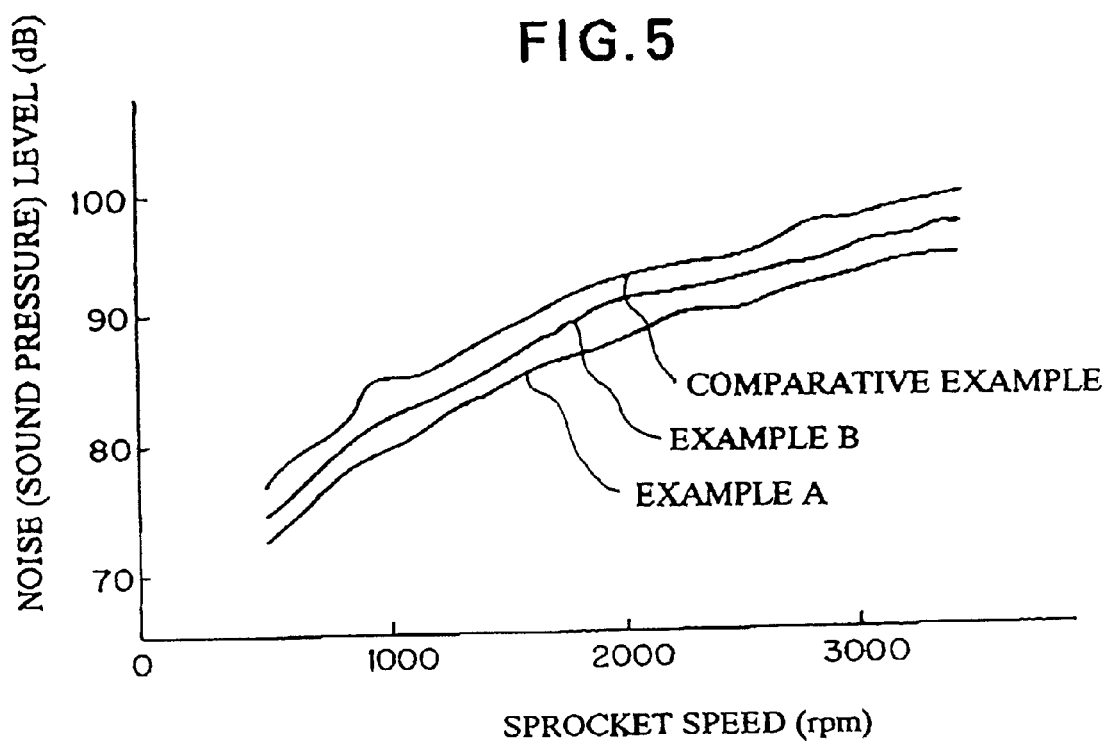

SILENT CHAIN

BACKGROUND OF THE INVENTION

1. Field of the Invention

The present invention relates to a silent chain including a number of link plates articulately connected together by pins and each having a pair of pin-accommodating holes receiving therein the pins and a pair of teeth for meshing engagement with teeth of a sprocket.

2. Description of the Related Art

In general, a silent chain includes joint trains of link plates and guide trains of link plates arranged alternately in the longitudinal direction of the chain. The joint trains and guide trains each have a plurality of link plates connected together in an interleaved fashion by means of connecting pins. The connecting pins may be a round pin or a rocker pin composed of a pair of pins of different lengths. The link plates each have a pair of teeth for meshing engagement with sprocket teeth and a pair of pin-accommodating holes in which the connecting pins are inserted for securing articulating movement of the adjacent link plates. Each of the guide link trains has two guide plates disposed on opposite outer sides thereof. In a special type of silent chain, link plates of the guide trains do not have teeth meshing with the sprocket teeth.

The link plates are produced by punching pin-accommodating holes and the contour of link plate out from a blank sheet either simultaneously or in succession using a power press. The punched or press-formed link plates have a pair of teeth on one side thereof each formed by an inside flank and an outside flank converging together at the tip of each tooth. The inside flank or the outside flank serves as an engagement surface for meshing engagement with teeth of a sprocket. The engagement surface has a rounded shear drop or depression, a smooth sheared surface, and a rough broken or ruptured surface formed contiguously across the thickness of the plate in the order named as viewed from the direction of punching.

In the link plates formed by the conventional punching process, the proportion of smooth sheared surface is about 20% the thickness of the plate. If such link plates are assembled into a silent chain, meshing engagement between the teeth of the link plates and teeth will produce a great contact pressure resulting in the occurrence of pitching wear on the sprocket teeth To deal with this problem, the engagement surfaces of the press-formed link plates are subjected to a post-treatment, such as shaving or fine-blanking, so as to increase the proportion of sheared surface up to 70% or greater of the thickness of the link plates. By thus increasing the proportion of sheared surface, the contact area between the link plate teeth and the sprocket teeth is enlarged to thereby reduce sear of the sprocket teeth (see Japanese Patent Laid-open Publication No. HEI-9-250599).

The link plate teeth having respective shear surfaces across more than 70% of the thickness of the link plate, however, give rise to a problem in that while the silent chain is traveling between two sprockets, impact or collision sound is generated at the onset of meshing engagement between the link plate teeth and the sprocket teeth, increasing the noise level during operation of a silent chain drive. This problem is not negligible, because the silent chain is essentially used in an application in which reduction of the operation noise is a major requirement.

A study and investigation made by the present inventors established the causality between the proportion of sheared surface and the noise level. More specifically, the noise level becomes high as the proportion of sheared surface exceeds 50% of the thickness of the link plate with respect to all of the link plates. This is due to a considerable increase in the rigidity of a meshing engagement portion of the link plate which is adapted to be meshed with the sprocket teeth.

SUMMARY OF THE INVENTION

It is accordingly a general object of the present invention to solve the foregoing problems associated with the conventional silent chains.

A more specific object of the present invention is to provide a silent chain which is capsble of reducing the level of noise produced due to meshing engagement between teeth of link plates of the silent chain and teeth of a sprocket.

According to one aspect of the present invention, there is provided a silent chain comprising: a number of link plates articulately connected together by connecting pins; each of the link plates being press-formed and having a pair of teeth on one side thereof and a pair of pin-accommodating holes formed therein and receiving respectively therein two of the connecting pins, and each of the teeth having a press-formed engagement surface for meshing engagement with teeth so a sprocket, the press-formed engagement surface having a sheared surface across not more than 60% of the thickness of the link plate. More than 50% of the link plates have respective sheared surfaces across 7 to 15% of the thickness of the link plates and are arranged randomly together with the remaining link plates.

The proportion off sheared surface of said remaining link plates is preferably not less than 7% of the thickness of the link plates.

It is preferable that the link plates having respective sheared surfaces across 7 to 15% of the thickness of the link plates are arranged randonly in the longitudinal direction, transverse direction, or both longitudinal and transverse directions of the silent chain. The link plates having respective sheared surfaces, across 7 to 15% of the thickness of the link plates preferably comprise a plurality of groups of link plates having different proportions of sheared surfaces.

As an alternative, all of the link plates may have respective sheared surfaces with proportions ranging from 7 to 15% of the thickness of the link plates. The link plates preferably comprise a plurality of groups of link plates having different proportions of sheared surfaces arranged randomly in the longitudinal direction, transverse direction or both longitudinal and transverse directions of the silent chain.

According to another aspect of the present invention, there is provided a silent chain comprising: a number of link plates articulately connected together by connecting pins; each of said link plates being press-formed and having a pair of teeth on one side thereof and a pair of pin-accommodating holes formed therein and receiving respectively therein two of the connecting pins; and each of the teeth having a press-formed engagement surface for meshing engagement with teeth of a sprocket, the press-formed engagement surface having a sheared surface across 7 to 15% of the thickness of the link plates. The link plates are interleaved with each other and form trains of link plates aligned in the transverse direction of the silent chain. The link plates in each of the link trains have the same proportion of sheared surface, and the proportion of sheared surface in one link train is different from the proportion of sheared surface in the adjacent link train.

The pressed-formed link plates having respective sheared surfaces across 7 to 15% of the thickness of the link plates provide a relatively small engagement area and hence can exhibit a cushioning effect with respect to the sprocket teeth when the engagement takes place between the link plate teeth and sprocket teeth. By the cushioning effect, thus provided impact or collision sound produced at the onset of the meshing engagement is effectively suppressed whereby the noise (sound pressure) level during coeration of the silent chain is considerably reduced.

BRIEF DESCRIPTION OF THE DRAWINGS

Preferred embodiment of the present invention will now be described in detail, by way of example only, with reference to the accompanying drawings, in which:

FIG. 5 is a grape showing the results of a noise test.

DETAILED DESCRIPTION OF THE PREFERRED EMBODIMENTS

The following description is merely exemplary in nature and is in no w;ay intended to limit the invention or its application or uses.

Figure 1:
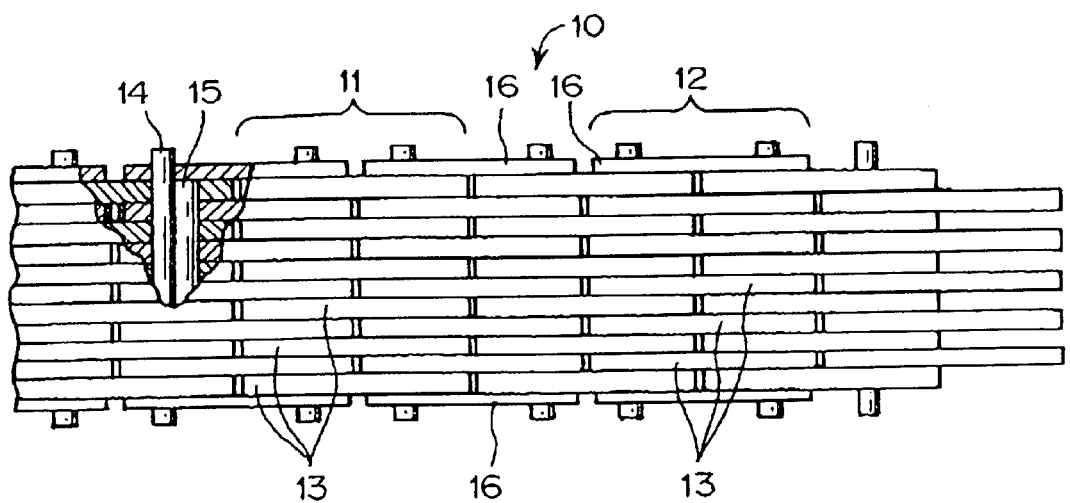
FIG. 1 is a fragmentary plan view, partly in cross section, of a silent chain according to the present invention.
Figure 2:
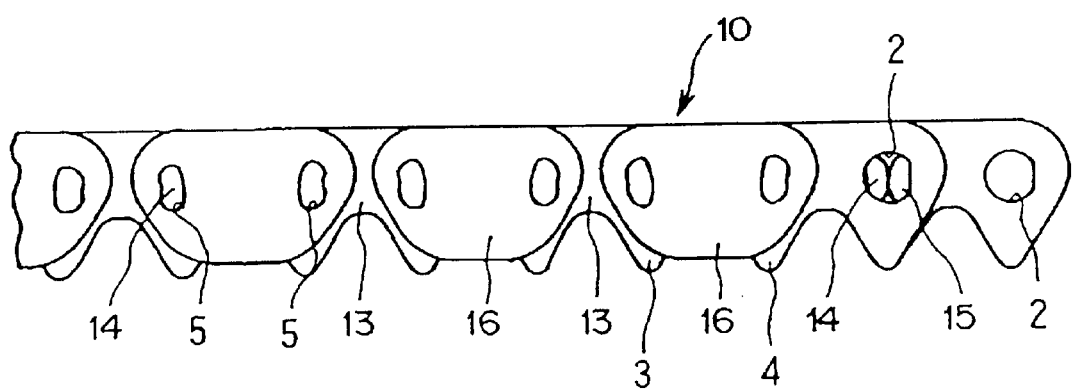
FIG. 2 is a side view of FIG. 1.

Referring now to the drawings and FIG. 1 in particular, there is shown a silent chain 10 embodying the present invention. The silent chain 10 includes joint trains 11 of link plates and guide trains 12 of link plates alternately arranged in the longitudinal direction of the silent chain 10. The guide trains 11 and joint trains 12 each have a plurality of link plates 13 connected together in an interleaved fashion by means of connector pins 14, 14. The connector pins 14, 15 comprise a rocker joint pin composed of a pair of rocker pins of different lengths As shown in FIG. 2, each of the link plates 13 has a pair of pin-accommodating holes 2, 2 formed therein and receiving respectively therein two pairs of rocker pins 14, 14 for securing articulate movement of the adjacent link plates 13, and a pair of teeth 3 and 4 formed on one side thereof for meshing engagement with teeth of a sprocket (not shown). Each of the guide link plate trains 12 has two guide plates 16 disposed on opposite outer sides thereof. The guide plates 16 have a pair of pin holes 5 in which the longer pins 14 are inserted. The guide plates 16 are devoid of teeth.

Figure 3:
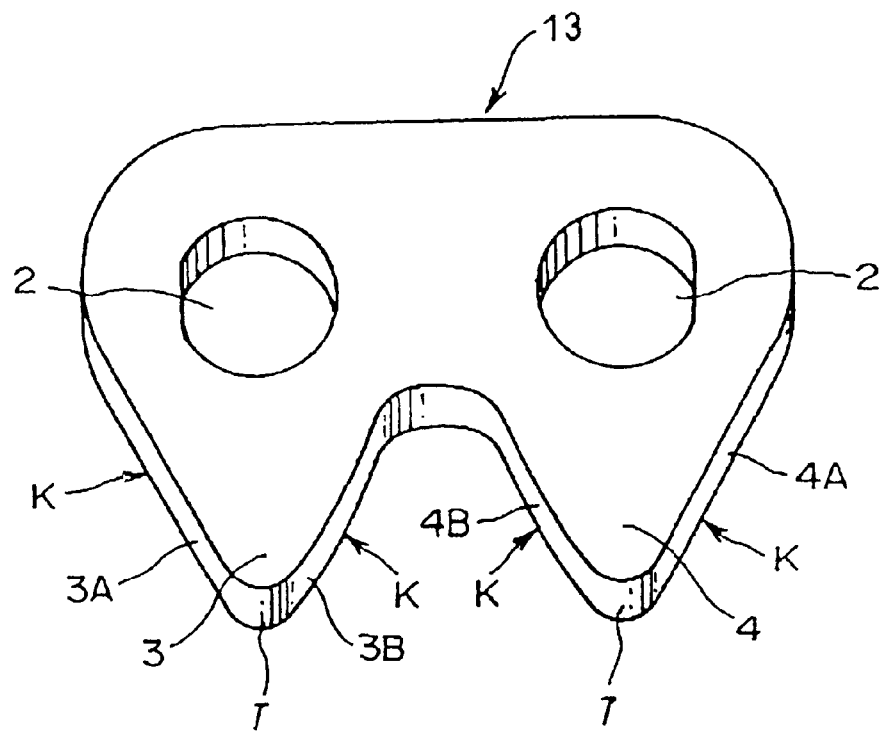
FIG. 3 is an enlarged perspective view of a link plate of the silent chain.

As shown in FIG. 3, each of the teeth 3 and 4 of the link plate 13 has an outside flank 3A, 4A and an inside flank 3B, 4B converging together at a tip T of the tooth 3, 4. The outside flanks 3A, 4A or the inside flanks 3B, 4B form an engagement surface K adapted to be meshed with the non-illustrated sprocket teeth. In an outside engagement type silent chain, the outside flanks 3A, 4A serve as engagement surfaces K for meshing engagement with the sprocket teeth. Alternatively, in an inside engagement type silent chain, the inside flanks 3B, 4B serve as engagement surfaces K for meshing engagement with the sprocket teeth. In a dual side engagement type silent chain, the inside and outside flanks 3A, 4A; 4A, 4B both serve in an appropriate manner as engagement surfaces for meshing engagement with the sprocket teeth.

Figure 4:
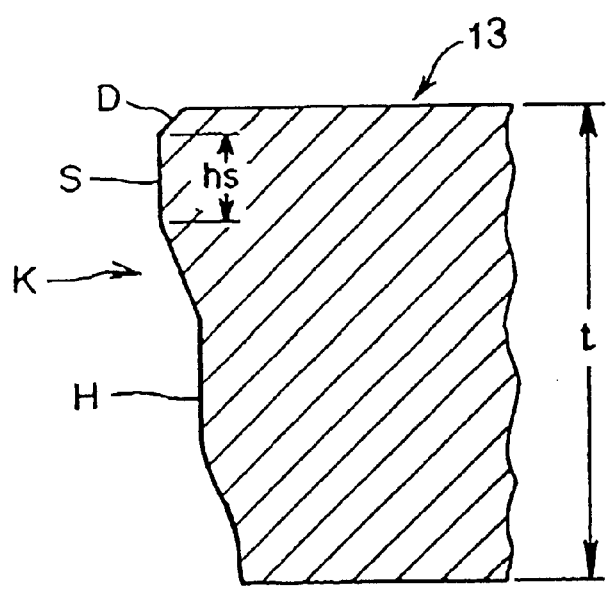
FIG. 4 is an enlarged cross-sectional view showing the structure of an engagement surface of the link plate.

The link plate 13 is produced by punching pin-accommodating holes 2 and the contour of link plate 13 out from a sheet metal on a power press, so that, as shown in FIG. 4, the engagement surface K has a rounded shear drop or depression D, a smooth sheared surface S and a rough ruptured or broken surface H formed contiguously across the thickness t of the plate 13 in the order named as viewed from the direction of punching. The sheared surface S has a length hs in the direction of the thickness of the link plate 13. The proportion of sheared surface S across the thickness t of the link plate 13, obtained by the formula: hs/t×100, can be easily changed by adjusting the clearance between a punch and a die used in the punching process. According to the present invention, the proportion of sheared surface S is not more than 60% of the thickness of the link plate 13. It is preferable that the proportion of sheared surface S is not less than 7% of the thickness of the link plates. A link plate having a sheared surface across less than 7% of the thickness of the link plate can suppress generation of noises when teeth of the link plate mesh with the sprocket teeth but is likely to suffer accelerated wear. In the case where engagement surfaces K with high sheared-surface proportion such as 20% or greater cannot be produced by punching, the punched or press-formed link plate may be subjected to a shaving process so as to increase the proportion of sheared surface to a desired value.

In the illustrated embodiment, the link plates 13 interleaved by the connector pins 14, 15 are arranged in single ply in both the joint trains 11 and the guide trains 12. It is possible according to the present invention to modify the arrangement of the link plates 13 in double ply in at least one of the joint trains 11 and the guide trains 12.

In one preferred form of the present invention, all of the link plates 13 of the silent chain 10 have respective sheared surfaces S across 7 to 15% of the thickness t of the link plates 13. If the proportion of sheared surface is less than 7%, the link plates 13 is susceptible to wear in a relatively short period of time in use. If the proportion of sheared surface exceeds 15%, the link plates 13 is unable to perform a desired cushioning effect resulting in reduction of the noise level during operation of the silent chain, as will be described later.

According to one variant of the preferred form, the link plates 13 comprise a plurality of groups of link plates having different proportions of sheared surfaces S and arranged randomly in the longitudinal direction of the s lent chain 10. According to another variant of the preferred form, the link plates 13 comprise a plurality of groups of link plates halving different proportions of sheared surfaces S and arranged randomly in the transverse direction of the silent chain 10. According to still another variant of the preferred form, the link plates 13 comprise a plurality of groups of link plates having different proportions of sheared surfaces S and arranged randomly in both the longitudinal and transverse directions of the silent chain 10.

According to a further variant of the preferred form, the link plates 13 comprise a plurality of groups of link plates having different proportions of sheared surfaces S and arranged such that the link plates 13 of each of the plural link plate groups (which have the same sheared-surface proportion selected within the range from 7 to 15% of the thickness of the link plates) form a single link train 11 or 12. With this arrangement, the link plates in ore link train 11 or 12 all have the same proportion of sheared surface S which is different from the proportion of sheared surface S of the link plates in the adjacent link train 12 or 11.

In a second preferred form of the present invention, all of the link plates 13 of the silent chain 10 have respective engagement surfaces K including sheared surfaces S across not more than 60% (but not less than 7%) of the thickness of the link slates 13, and more than 50% of the link plates 13 have respective sheared surfaces S across 7 to 15% of the thickness of the link plates 13 and are arranged randomly in the silent chair.

According to one variant of the second preferred form, the link plates having respective sheared surface across 7 to 15% of the thickness of the link plates comprise a plurality of groups of link plates having different proportions of sheared surfaces S arranged randomly in the longitudinal direction of the silent chain 10 in combination with the remaining link plates having respective sheared surfaces across not more than 60% of the thickness of the link plates.

According to another variant of the second preferred form, the link plates having respective sheared surface across 7 to 15% of the thickness of the link plates comprise a plurality of groups of link plates having different proportions of sheared surfaces S arranged randomly in the transverse direction of the silent chain 10 in combination with the remaining link plates having respective sheared surfaces across not more than 60% of the thickness of the link plates.

According to still another variant of the second preferred form, the link plates having respective sheared surface across 7 to 15% of the thickness of the link plates comprise a plurality of groups of link plates having different proportions of sheared surfaces S arranged randomly in both the longitudinal and transverse directions of the silent chain 10 in combination with the remaining link plates having respective sheared surfaces across not more than 60% of the thickness of the link plates.

A noise test was made using three different types of silent chains. The silent chains used in the test were of the outside engagement type in which outside flanks of the teeth of each link plate serve as engagement surfaces for meshing engagement with teeth of a sprocket. The link plates forming the tested silent chains had the same contour and dimensions, and pin-accommodating holes in the link plates had a sheared surface across approximately 70% of the thickness of the link plate.

EXAMPLE A

One of the silent chains (hereinafter referred to as "Example A") was formed solely by those link plates having sheared surfaces across 7 to 15% of the thickness of the link plates. The link plates were composed of plural groups of link plates with different proportions of sheared surfaces arranged randomly in both the longitudinal and transverse directions of the silent chain.

EXAMPLE B

A second silent chain (hereinafter referred to as "Example B") was formed by first link plates having sheared surfaces across 7 to 15% of the thickness of the link plates, and second link plates having sheared surfaces across 50 to 60% of the thickness of the link plates. The proportion in number of first link plates to second link plate was 1.1. The first link plates were composed of plural groups of first link plates with different proportions of sheared surfaces arranged randomly in both the longitudinal and transverse directions of the silent chain in combination with the second link plates.

Comparative Example

The last silent chain (hereinafter referred to as "Example A") was formed solely by those link plates having sheared surfaces across 50 to 60% of the thickness of the link plates and arranged randomly in both the longitudinal and transverse directions of the silent chain.

In the noise test, each of the silent chains trained between two sprockets (having thirty-five teeth) disposed inside a soundproof boxed was driven, and while continuously changing the rotating speed of the sprockets, sounds with all frequencies collected at a microphone were measured as noise levels. The results of the noise test are shown in FIG. 5.

It appears clear from FIG. 5 that the noise level of Example A (i.e., the silent chain formed solely by the link plates with sheared surfaces across 7 to 15% of the thickness of the link plates) is the lowest among three tested silent chains, and the noise level of Example B (i.e., the silent chain formed as partly including link plates having sheared surfaces across 7 to 15% of the thickness of the link plates) is lower than that of Comparative Example (i.e., the silent chain formed solely by link plates having sheared surfaces across 50 to 60% of the thickness of the link plates).

As described above, a silent chain according to the present invention comprises a number of articulately connected link plates each having a pair of teeth. The link plates are press-formed, and each tooth has a press-formed engagement surface including a smooth sheared surface for meshing engagement with teeth of a sprocket. The proportion of sheared surface is to be not more than 60% of the thickness of the link plate. If the proportion of sheared surface exceeds 60% of the thickness of the link plate, collision sounds with increased intensity are produced at the onset of meshing engagement between the link plate teeth and the sprocket teeth, thus increasing the noise level during operation of the silent chain. To avoid this problem, according to the invention, more than 50% of the link plates have respective sheared surfaces across 7 to 15% of the thickness of the link plates, so as to provide a relatively small engagement area with respect to the sprocket teeth. By virtue of the relatively small engagement area, the link plates having respective sheared surfaces across 7 to 15% of the thickness of the link plates can exhibit a cushioning effect with respect to the sprocket teeth when the engagement takes place between the link plate teeth and sprocket teeth. By thus provided cushioning effect, impact or collision sounds produced at the onset of the meshing engagement are effectively suppressed whereby the noise (sound pressure) level during operation of the silent chain is considerably reduced.

Obviously, various mirror changes and modifications of the present invention are possible in the light of the above teaching. It is therefore to be understood that within the scope of the appended claims, the present invention ay be practiced otherwise than as specifically described.

What is claimed is:

1. A silent chain comprising:

a number of link plates articulately connected together by connecting pins;

each of the link plates being press-formed and having a pair of teeth on one side thereof and a pair of pin-accommodating holes formed therein and receiving respectively therein two of the connecting pins, each of the teeth having a press-formed engagement surface for meshing engagement with teeth of a sprocket, the press-formed engagement surface having a sheared surface across not more than 60% of the thickness of the link plate; and more than 50% of the link plates having respective sheared surfaces across 7 to 15% of the thickness of the link plates and being arranged randomly together with the remaining link plates.

2. A silent chain according to claim 1, wherein the proportion of sheared surfaces of said remaining link plates is not less than 7% of the thickness of the link plates.

3. A silent chain according to claim 1, wherein the link plates having respective sheared surfaces across 7 to 15% of the thickness of the link plates are arranged randomly in the longitudinal direction of the silent chain.

4. A silent chain according to claim 3, wherein the link plates having respective sheared surfaces across 7 to 15% of the thickness of the link comprise a plurality of groups of link plates having different proportions of sheared surfaces.

5. A silent chain according to claim 1, wherein the link plates having respective sheared surfaces across 7 to 15% of the thickness of the link are arranged randomly in the transverse direction of the silent chain.

6. A silent chain according to claim 5, wherein the link plates having respective sheared surfaces across 7 to 15% of the thickness of the link plates comprise a plurality of groups of link plates having different proportions of sheared surfaces.

7. A silent chain according to claim 1, wherein the link plates having respective sheared surfaces across 7 to 15% of the thickness of the link are arranged randomly in both the longitudinal and transverse directions of the silent chain.

8. A silent chain according to claim 7, wherein the link plates having respective sheared surfaces across 7 to 15% of the thickness of the link plates comprise a plurality of groups of link plates having different proportions of sheared surfaces.

9. A silent chain according to claim 1, wherein all of the link plates have respective sheared surfaces across 7 to 15% of the thickness of the link plates.

10. A silent chain according to claim 9, wherein the link plates comprise a plurality of groups of plates having different proportions of sheared surfaces arranged randomly in the longitudinal direction of the silent chain.

11. A silent chain according to claim 9, wherein the link plates comprise a plurality of groups of link plates having different proportions of sheared surfaces arranged randomly in the transverse direction of the silent chain.

12. A silent chain according to claim 9, wherein the link plates comprise a plurality of groups of link plates having different proportions of sheared surfaces arranged randomly in both the longitudinal and transverse directions of the silent chain.

13. A silent chain comprising:

a number of link plates articulately connected together by connecting pins, each of said link plates being press-formed and having a pair of teeth on one side thereof and a pair of pin-accommodating holes formed therein and receiving respectively therein two of the connecting pins, and each of the teeth having a press-formed engagement surface for meshing engagement with teeth of a sprocket, the press-formed engagement surface having a sheared surface across 7 to 15% of the thickness of the link plates.

14. A silent chain according to claim 13, wherein the link plates are interleaved with each other and form trains of link plates aligned in the transverse direction of the silent chain, the link plates in each of the link trains have the same proportion of sheared surface, and the proportion of sheared surface in one link train is different from the proportion of sheared surface in the adjacent link train.

* * * * *

UNITED STATES PATENT AND TRADEMARK OFFICE
CERTIFICATE OF CORRECTION

PATENT NO.     : 6,272,835 B1                                   Page 1 of 1
DATED          : August 14, 2001
INVENTOR(S)    : Hiroshi Horie et al.

It is certified that error appears in the above-identified patent and that said Letters Patent is hereby corrected as shown below:

Column 1,
Line 54, "sear" should read -- wear --.

Column 2,
Line 12, "capsble" should read -- capable --.

Column 3,
Line 7, "coeration" should read -- operation --.
Line 22, "grape" should read -- graph --;
Line 27, "w;ay" should read -- way --;

Column 4,
Line 42, "s lent" should read -- silent --;
Line 45, "halving" should read -- having --;
Line 60, "ore" should read -- one --;

Column 5,
Line 1, "slates" should read -- plates --;

Column 6,
Line 46, "mirror" should read -- minor --;

Column 7,
Line 34, "plates" should read -- link plates --.

Signed and Sealed this

Fourteenth Day of May, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,272,835 B1
DATED         : August 14, 2001
INVENTOR(S)   : Hiroshi Horie et al.

It is certified that error appears in the above-identified patent and that said Letters Patent is hereby corrected as shown below:

<u>Title page,</u>
After Item [22], insert: -- [30]  Foreign Application Priority Data
                       October 29, 1999     (JP)………………….. 11-310337 --
Item [57], ABSTRACT,
Line 6, "along" should read -- across --;

Signed and Sealed this

Twenty-sixth Day of November, 2002

*Attest:*

JAMES E. ROGAN
*Attesting Officer*     *Director of the United States Patent and Trademark Office*